(12) United States Patent
Yang et al.

(10) Patent No.: US 10,534,445 B2
(45) Date of Patent: Jan. 14, 2020

(54) METHOD AND DEVICE FOR FACILITATING TEXT EDITING AND RELATED COMPUTER PROGRAM PRODUCT AND COMPUTER READABLE MEDIUM

(75) Inventors: Fan Yang, Beijing (CN); Shijun Yuan, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 1308 days.

(21) Appl. No.: 13/575,913

(22) PCT Filed: Jan. 29, 2010

(86) PCT No.: PCT/CN2010/070426
§ 371 (c)(1),
(2), (4) Date: Jul. 27, 2012

(87) PCT Pub. No.: WO2011/091603
PCT Pub. Date: Aug. 4, 2011

(65) Prior Publication Data
US 2012/0311439 A1 Dec. 6, 2012

(51) Int. Cl.
*G06F 17/00* (2019.01)
*G06F 3/023* (2006.01)
(52) U.S. Cl.
CPC .................. *G06F 3/0233* (2013.01)
(58) Field of Classification Search
CPC ... G06F 17/276; G06F 3/0233; G06F 3/04886
USPC .......... 715/271, 200, 739, 255, 256
See application file for complete search history.

(56) References Cited

U.S. PATENT DOCUMENTS

| | | | | |
|---|---|---|---|---|
| 6,527,812 B1* | 3/2003 | Bradstreet | ...................... | 715/210 |
| 6,751,603 B1* | 6/2004 | Bauer et al. | | |
| 8,316,035 B2* | 11/2012 | Chen et al. | .................... | 707/758 |
| 2004/0205663 A1* | 10/2004 | Mohamed | ...................... | 715/530 |
| 2008/0180283 A1 | 7/2008 | Nordenhake | | |
| 2009/0112576 A1 | 4/2009 | Jackson | | |
| 2009/0193332 A1* | 7/2009 | Lee | ................................ | 715/256 |
| 2010/0169341 A1* | 7/2010 | Hu et al. | ........................ | 707/758 |
| 2011/0219299 A1* | 9/2011 | Scalosub | ........................ | 715/261 |

FOREIGN PATENT DOCUMENTS

| | | |
|---|---|---|
| CN | 101216854 A | 7/2008 |
| CN | 101387919 A * | 3/2009 |
| JP | H06309315 | 11/1994 |
| JP | H08161328 | 6/1996 |

(Continued)

OTHER PUBLICATIONS

Office Action received for corresponding Japanese Application No. 2012-550291, dated Nov. 28, 2013, 8 pages.

(Continued)

*Primary Examiner* — Manglesh M Patel
(74) *Attorney, Agent, or Firm* — Alston & Bird LLP

(57) ABSTRACT

The present invention provides a solution for facilitating text editing in a device. According to the solution of the present invention, the language unit that has been already deleted is prompted to the user for his/her selection. According to the present invention, if the user makes a mistake, he has a chance to recover language units which have been deleted, but no need to repeat the inputting.

12 Claims, 6 Drawing Sheets

(56) References Cited

FOREIGN PATENT DOCUMENTS

| | | |
|---|---|---|
| JP | H11-212967 A | 8/1999 |
| JP | 2008-030848 | 2/2008 |
| JP | 2008-250606 A | 10/2008 |
| JP | 2008-250708 | 10/2008 |
| WO | WO 2007/017660 | 2/2007 |

OTHER PUBLICATIONS

Office Action received for corresponding Chinese Application No. 201110034982.2, dated Jan. 10, 2014, 9 pages.
International Search Report and Written Opinion received for corresponding Patent Cooperation Treaty Application No. PCT/CN2010/070426, dated Nov. 11, 2010, 14 pages.
Office Action received for corresponding Chinese Patent Application No. 201110034982.2, dated Jul. 16, 2012, 8 pages of Office Action and 11 pages of Office Action translation.
Office Action received for corresponding Chinese Patent Application No. 201110034982.2, dated Jun. 4, 2013, 7 pages of Office Action and 3 pages of Office Action translation.
Extended European Search Report for corresponding European Application No. 10844381.3 dated Apr. 18, 2017, 7 pages.
Extended European Search Report for Application No. EP 10 84 4381 dated Jul. 24, 2017, 11 pages.

\* cited by examiner

METHOD AND DEVICE FOR FACILITATING TEXT EDITING AND RELATED COMPUTER PROGRAM PRODUCT AND COMPUTER READABLE MEDIUM

RELATED APPLICATION

This application was originally filed as PCT Application No. PCT/CN2010/070426 filed Jan. 29, 2010.

FIELD OF THE INVENTION

The present invention generally relates to the field of text editing and, more particularly, to a method and device for facilitating text editing in touch-based text editing and relevant computer program products and storage medium.

BACKGROUND OF THE INVENTION

Nowadays, more and more potable devices, such as handheld phones, personal digital assistants (PDAs) and the like are equipped with a touch screen capable of simultaneously performing an input operation and a display operation in one device to replacing or at least partly replacing conventional alphanumeric and directional keys in terms of their functions. With the development of touch screen technique, touch screens have been one of the most important inputting tools in portable devices. Although finger interaction with a touch screen is more intuitive and natural for most potable device users, a finger is perceived as lack of precision with respect to the touch screen. One reason for this is that the portable device is manufactured with a small size for portability and the size of its touch screen and the items that it can display are limited. Mis-input or misoperation is a normal behavior when a user does input in a potable device with a touch screen.

In the situation of text editing in the screen of the portable device, a user often uses deletion operations to correct inputted text. In a conventional portable device, when a deletion operation is performed in text editing, one or more language units which have been inputted are deleted permanently from the text. There is almost no chance to the user to recover or reuse the deleted language units, unless the user repeats his input. For example, in the case that the user removes undesired language units from the inputted text and wants to recover the deleted ones, he/she has to enter the same input string again to achieve the language units same as the deleted ones. In another example, in the case that the user selects a wrong candidate from a candidate list and wants to correct this selecting error, he/she needs to firstly delete wrong language unit(s) corresponding to the wrong candidate and secondly re-enter the same input string again to achieve the same candidate list. It is quite difficult to fix his/her deleting error and selecting error in a conventional potable device especially based on touch input due to a limited size of a touch screen.

Therefore, there is a desire of a new mechanism for facilitating text editing for handle deletion operations.

The above discussion is merely provided for general background information and is not intended to be used as a limitation to the scope of the claimed subject matters in the present application.

SUMMARY OF THE INVENTION

To solve the technical problems in the prior art, the present invention proposes a solution for facilitating text editing so as to handle deletion operations in a portable device.

According to an embodiment of the present invention, there is provided a method for facilitating text editing. The method comprises A method for facilitating text editing, comprising: detecting a deletion operation with respect to a language unit; retrieving input string information corresponding to the language unit from a memory which is configured to store input string information corresponding to inputted language units during text inputting; providing the retrieved input string information to an input engine to obtain a candidate list based on the input strings; prompting the retrieved candidate list for the user's selection. There are also provided relevant portable device and computer program product for facilitating text editing.

According to another embodiment of the present invention, there is provided a method for facilitating text editing. The method comprises: detecting a deletion operation with respect to a language unit; storing the deleted language unit in an order specified by the deletion operation; prompting at least the language unit with respect to which the deletion operation was just performed for the user's selection. There are also provided relevant portable device and computer program product for facilitating text editing.

According to another embodiment of the present invention, there is provided a method for facilitating text editing. The method comprises: detecting a deletion operation with respect to a language unit; determining whether the deletion operation is with respect to a language unit which was inputted by selecting a candidate from a candidate list just now; in responsive to that the deletion operation is with respect to a language unit which was inputted by selecting a candidate from a candidate list just now, retrieving input string information corresponding to the language unit from a memory which is configured to store input string information corresponding to inputted language units during text inputting, providing the retrieved input string information to an input engine to obtain a candidate list based on the input strings, prompting the retrieved candidate list for the user's selection; in responsive to that the deletion operation is not with respect to a language unit which was inputted by selecting a candidate from a candidate list just now, storing the deleted language unit in an order specified by the deletion operation; prompting at least the language unit with respect to which the deletion operation was just performed for the user's selection. There are also provided relevant portable device and computer program product for facilitating text editing.

BRIEF DESCRIPTION ON THE DRAWINGS

As the present invention is better understood, other objects and effects of the present invention will become more apparent and easy to be understood from the following description, taken in conjunction with the accompanying drawings wherein:

FIG. 1 schematically shows a flow chart of a method for facilitating text editing according to one illustrative embodiment of the present invention;

FIG. 2 schematically shows views of a user interface in which the method of FIG. 1 is implemented, according to one illustrative embodiment of the present invention;

FIG. 3 schematically shows a flow chart of a method for facilitating text editing according to another illustrative embodiment of the present invention;

FIG. 4 schematically shows views of a user interface in which the method of FIG. 3 is implemented, according to one illustrative embodiment of the present invention;

FIG. 5 schematically shows a flow chart of a method for facilitating text editing according to another illustrative embodiment of the present invention;

Like reference numerals designate the same, similar, or corresponding features or functions throughout the drawings.

DESCRIPTION OF THE PREFERRED EMBODIMENTS

Figure 1:
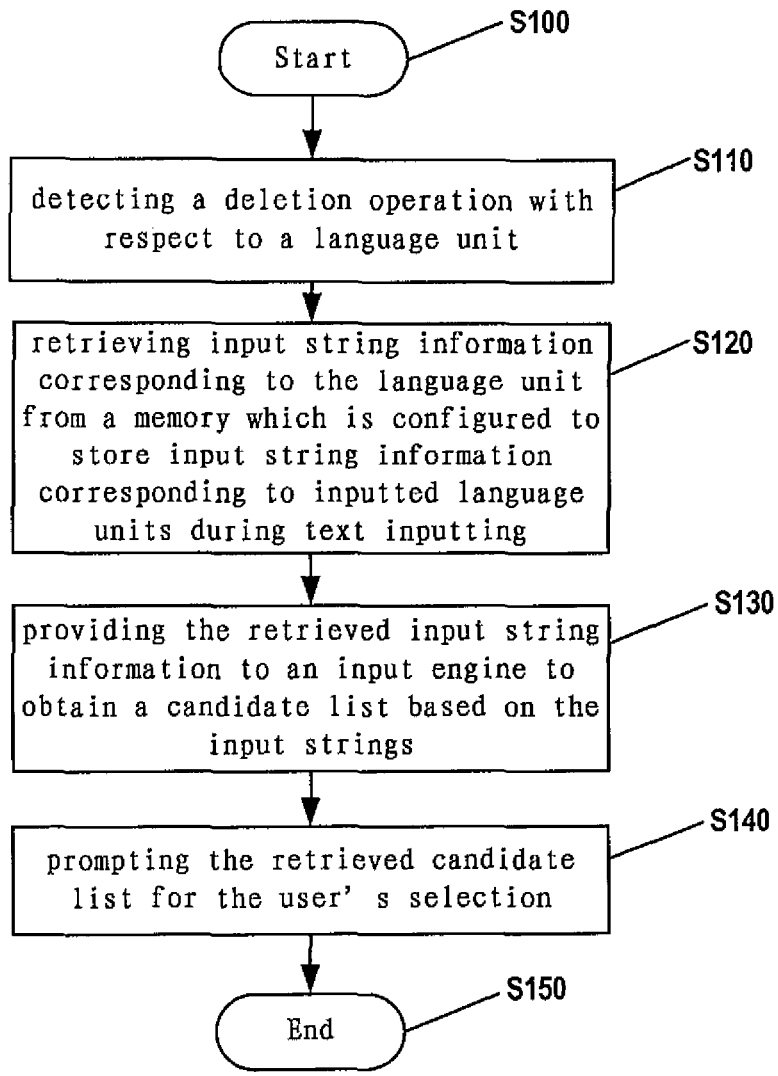

FIG. 1 schematically shows a flow chart of a method for text editing according to one illustrative embodiment of the present invention.

As shown in FIG. 1, at step S100, the flow of a method for text editing according to one illustrative embodiment of the present invention starts.

At step S110, a deletion operation with respect to a language unit is detected. The deletion operation can be enabled by any applicable mechanism in the art, such as tapping a virtual backspace key in a touch screen of a portable device, making a specific gesture designated to deletion operation on the touch screen of the portable device, etc.

It should be appreciated that the term "language unit" means any language unit which can be edited (inputted and deleted) or recognized as a whole. For example, a language unit can be a character, a word, a phrase, etc. Herein, Chinese is used as an exemplary language to set forth the concept of the present invention. However, those skilled in the art can appreciate that the present invention is not limited to any specific language and input method but adapts to various languages as well as respective suitable input methods.

At step S120, input string information corresponding to the language unit are retrieved from a memory which is configured to store input string information corresponding to inputted language units during text inputting.

The input string information corresponding to respective inputted language units can be stored in the memory such as a cache while performing text input. Depending on various implementations, the input string information corresponding to the inputted language units can include for example a mapping table of each language unit and its respective original input string, which is cached while the user performs text input. When a language unit is deleted, the original input string corresponds to the language unit can be retrieved based the mapping table.

Preferably, the cache can be cleared regularly or in responsive to meeting certain criterions. Typically, if a symbol is inputted subsequently, the cursor is moved from the current input focus, a new input string is inputted after a deletion operation, and the like, the language units which have already been inputted continuously can be regarded as being confirmed by the user. At that time, there is no need to maintain the input string information corresponding to the language units already inputted and the cache can be cleared for caching following input string information. Those skilled in the art can appreciate that there still exist other conditions in which the cache can be cleared, for example, changing the input mode, switching the input language, closing the input method and so on. It should be noted that description of the embodiment of the present invention is not intended to exhaust all possible implementations. At step S130, the retrieved input string information is provided to an input engine to obtain a candidate list based on the input strings. The candidate list comprises the deleted language unit as one of candidates among others.

At step S140, the retrieved candidate list is prompted for the user's selection. In case that a desired language unit is comprised in the prompted candidate list, the user can directly select the desired one instead of repeating the same input string.

Of course, the user is also allowed to ignore the displayed candidate list and enter different input strings to retrieve from the input engine and display on the screen a new candidate list for further selection.

At step S150, the flow of a method for text editing according to one illustrative embodiment of the present invention ends.

Figure 2:
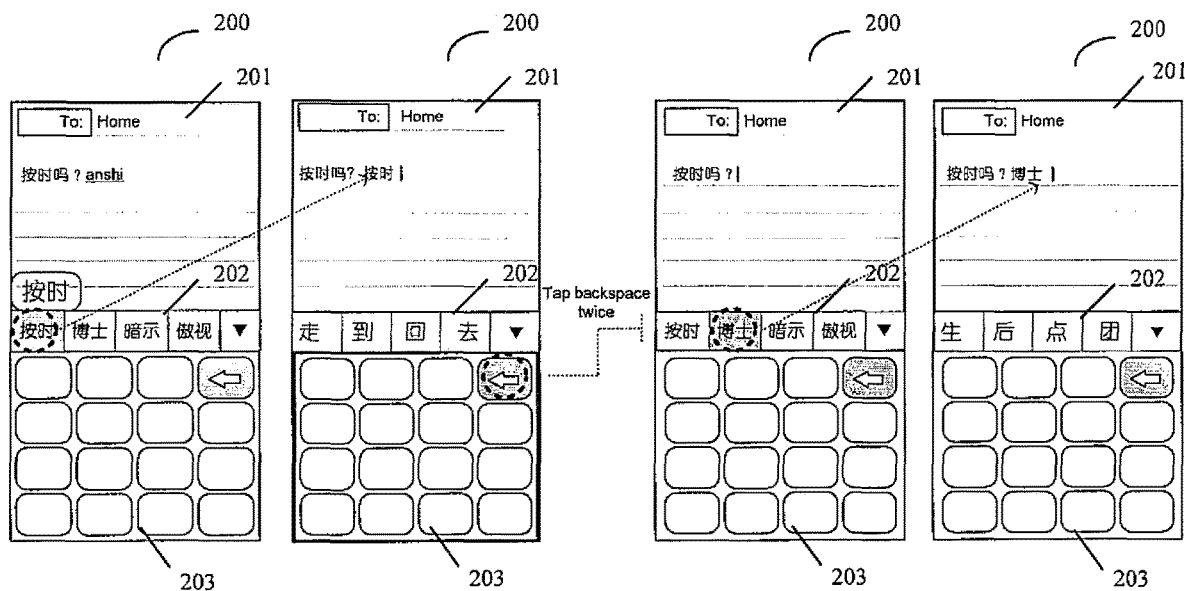

As described above, the embodiment of the present invention as illustrated by FIG. 1 is advantageous especially in the situation that after inputting a language unit in one time, the user realizes he/she selects a wrong candidate from candidate list. When the user performs a deletion operation with respect to the inputted wrong candidate, the candidate list by his/her previous inputting is displayed in the screen for further selection, according to this embodiment of the present invention. With reference to FIG. 2, such user experience would be more apparent.

FIG. 2 schematically shows views of a user interface in which the method of FIG. 1 is implemented, according to one illustrative embodiment of the present invention.

As shown in FIG. 2, the user interface 200 is displayed with several functional regions. Reference numeral 201 denotes text editing region for showing, for example, inputted text, a cursor indicating a current input focus and other information relating to text editing such as an input method or modality currently used. Reference numeral 202 denotes input prompting region for prompting a candidate list for specific input or resulted from prediction for further input. Reference numeral 203 denotes a virtual keypad/keyboard region with necessary functional buttons for example a delete button and/or a backspace button for enabling a deletion operation.

It should be noted that the user interface 200 shown in FIG. 2 is only an example of the user interfaces based on which embodiments of the present invention can be implemented, but not a limitation to the features possessed by those user interfaces.

Additionally, the embodiments of the present invention are set forth based on the user interface implemented with a touch screen technology and touch-based text editing may actually benefit from the embodiments of the present invention to a great extend. However, those skilled in the art can appreciate that the touch screen as well as touch-based text editing is not essential to implement the embodiments of the present invention and the embodiments of the present invention can improve the user experience in text editing with much high satisfaction regardless of whether the touch screen is adopted in the potable device.

As shown in FIG. 2, the user enters an input string "anshi" by pressing the virtual buttons contained in the virtual keypad/keyboard region 203. An input engine (not shown) receives the input string and provides a candidate list based on the input string. The candidate list, which includes Chinese phrases "按时", "博士", "暗示", "傲视", etc. as candidates for the input string "anshi", is prompted in the input prompting region 202 for the user's selection. In responsive to the user selecting a candidate "按时", the phrase is inputted into the text editing region 201 with a cursor followed to indicating the current input focus. At the same time, the input string information "anshi" corresponding to the inputted language unit "按时" is stored into a specified memory such as a cache (not shown).

In the case that the user finds that the inputted phrase "按时" is not the desired language unit and wants to replace it, the user performs a deletion operation with respect to the phrase "按时" by for example tapping backspace button twice. In responsive to the deletion operation, the inputted phrase "按时" is removed from the text editing region 201 and the original input string "anshi" corresponds to the deleted language unit "按时" can be retrieved from the cache. The retrieved input string information "anshi" is provided to the input engine to obtain again the candidate list based on the input string "anshi". Just as displayed previously, the same candidate list for "anshi" is prompted in the input prompting region 202, which includes Chinese phrases "按时", "博士", "暗示", "傲视", etc. for the user's selection.

In the example shown in FIG. 2, if the user realizes that his/her desired phrase has already prompted in the input prompting region 202, he/she then directly selects the desired one "博士" to insert it at the current input focus in the text editing region 201, without repeating the input string "anshi". If there is no desired language unit in the prompted candidate list, the user is allowed to ignore the candidate list and enter different an input string to retrieve from the input engine and display on the screen a new candidate list for further selection. Under such condition, the cache can be cleared for caching following input string information according to an implementation of the embodiment of the present invention.

With respect to handling the case in which a series of deletion operations are performed subsequently to inputted text, there are various design options depending on different policies designed for caching. Those skilled in the art can appreciate that more input string information corresponding to the inputted language units needs to be remembered, more caching space is occupied. Therefore, efficiency of memory resource of the potable device should also be taken into account.

Figure 3:
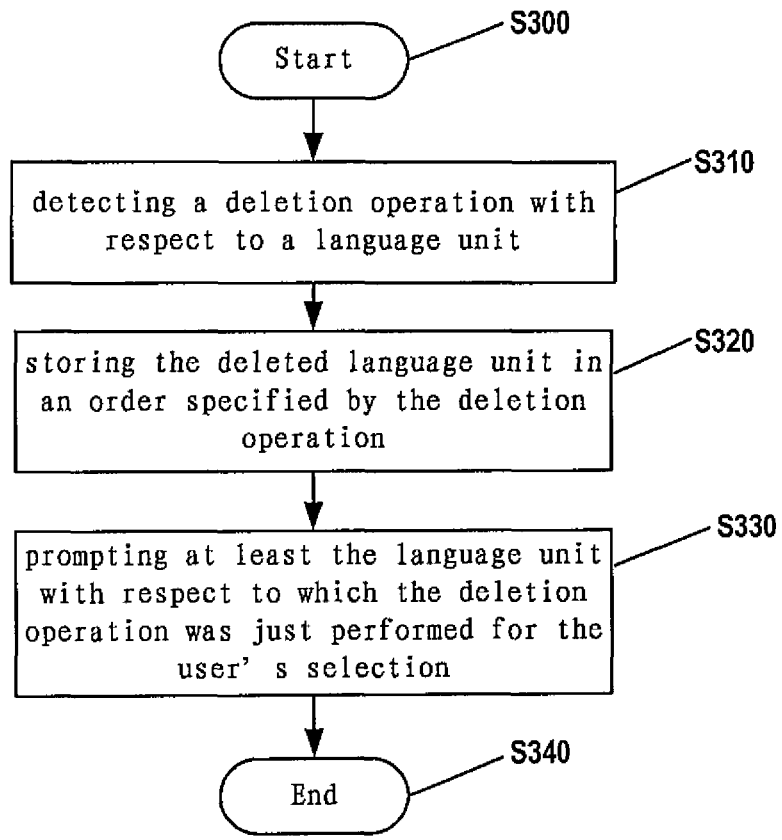

FIG. 3 schematically shows a flow chart of a method for facilitating text editing according to another illustrative embodiment of the present invention.

As shown in FIG. 3, at step 300, the flow of a method for text editing according to another illustrative embodiment of the present invention starts.

At step S310, a deletion operation with respect to a language unit is detected. The deletion operation can be enabled by any applicable mechanism in the art, such as tapping a virtual backspace key in a touch screen of a portable device, making a specific gesture designated to deletion operation on the touch screen of the portable device, etc.

It should be appreciated that the term "language unit" means any language unit which can be edited (inputted and deleted) or recognized as a whole. For example, a language unit can be a character, a word, a phrase, etc. With reference to the following description of this embodiment, those skilled in the art can appreciate that according to the embodiment as illustrated in FIG. 3, a symbol can also be treated as a language unit. Herein, Chinese is used as an exemplary language to set forth the concept of the present invention. However, those skilled in the art can appreciate that the present invention is not limited to any specific language and input method but adapts to various languages as well as respective suitable input methods.

At step S320, the deleted language unit is stored in an order specified by the deletion operation. For example, deleted language unit can be popped into a stack (Last In First Out) into each deletion operation in sequence.

Preferably, the stack can be emptied regularly or in responsive to meeting certain criterions. Typically, if after a deletion operation, a symbol or other new input strings is inputted, the cursor is moved from the current input focus, and the like, the language units which have already been inputted continuously can be regarded as being confirmed by the user. The stack can be emptied for popping into language units deleted later. Those skilled in the art can appreciate that there still exist other conditions in which the stack can be emptied, for example, changing the input mode, switching the input language, closing the input method and so on. It should be noted that the description of the embodiment of the present invention is not intended to exhaust all possible implementations.

At step S330, at least the language unit with respect to which the deletion operation was just performed is prompted for the user's selection. According to one implementation, at least the language unit which is currently on the top of the stack is prompted for the user's selection. In case that the user wants to recover the language unit(s) just deleted, the user can directly select the language units prompted in for example a specific region of the user interface, instead of repeating inputting. When the user recovers a language unit by selecting a prompted deleted one, the language unit is popped out from the stack.

At step S340, the flow of a method for text editing according to another illustrative embodiment of the present invention ends.

Figure 4:
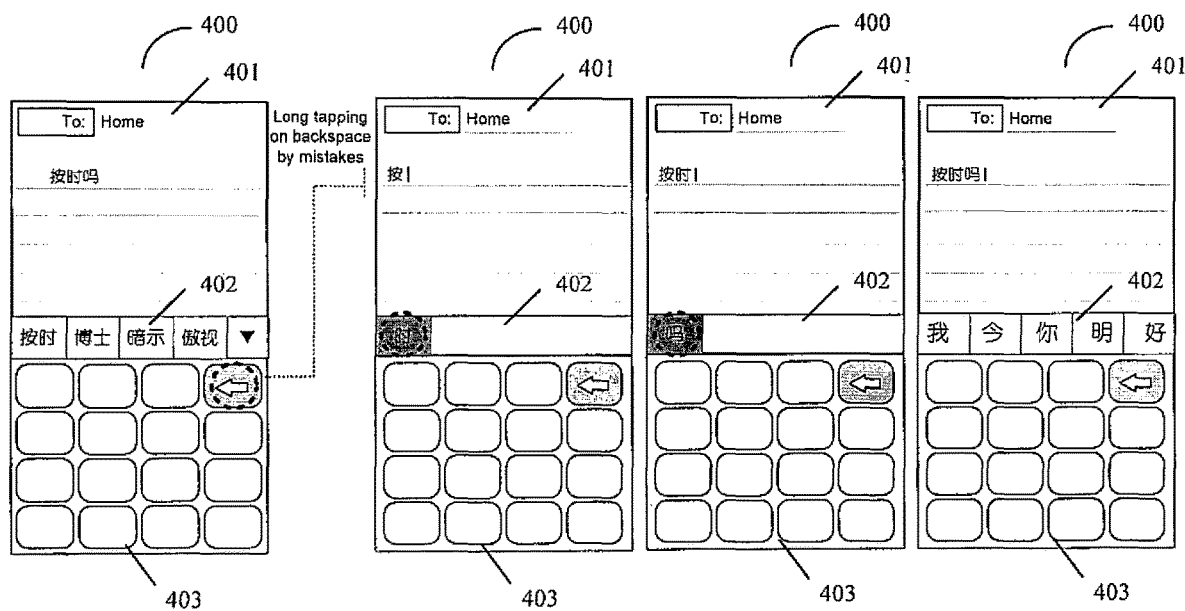

As described above, the embodiment of the present invention as illustrated by FIG. 3 is advantageous especially in the situation that after deleting a language unit(s) from the edited text, the user changes his/her mind and wants to keep the language unit(s) just deleted in the text. The deleted language unit(s) can be recovered by directly selecting language unit(s) prompted in for example a specific region of the user interface one by one, without repeating the inputting. With reference to FIG. 4, such user experience would be more apparent.

FIG. 4 schematically shows views of a user interface in which the method of FIG. 3 is implemented, according to one illustrative embodiment of the present invention.

As shown in FIG. 4, the user interface 400 is displayed with several functional regions. Reference numeral 401 denotes text editing region for showing at least inputted text, a cursor indicating a current input focus and other information relating to text editing such as an input method or modality currently used. Reference numeral 402 denotes input prompting region for prompting a candidate list for specific input or resulted from prediction for further input. Reference numeral 403 denotes a virtual keypad/keyboard region with necessary functional buttons for example a delete button and/or a backspace button for enabling a deletion operation.

It should be noted that the user interface 400 shown in FIG. 4 is only an example of the user interfaces based on which embodiments of the present invention can be implemented, but not a limitation to the features possessed by those user interfaces.

Additionally, the embodiments of the present invention are set forth based on the user interface implemented with a touch screen technology and touch-based text editing may actually benefit from the embodiments of the present invention to a great extend. However, those skilled in the art can appreciate that the touch screen as well as touch-based text editing is not essential to implement the embodiments of the present invention and the embodiments of the present invention can improve the user experience in text editing with much high satisfaction regardless of whether the touch screen is adopted in the potable device.

As shown in FIG. 4, the user is editing text "按时 吗" shown in the text editing region 401. The user for example enables deletion operations for example by long tapping on the backspace button by mistakes. In responsive to the deletion operations, Chinese characters "时" and "吗" are deleted and removed from the text editing region 401. The deleted language units are popped into a stack in an order specified by the deletion operation and the language unit which is currently on the top of the stack is prompted in the input prompting region 402 for the user's selection. In the example shown in FIG. 4, Chinese character "时" is prompted in the input prompting region 402. In the case that the user selects character "时", the language unit "时" is popped out from the stack and the following language unit "吗" is currently on the top of the stack. As a consequence, Chinese character "吗" is subsequently prompted in the input prompt region 402 for the user's selection. The user may then recover character "吗" in the inputted text by selecting the prompted language unit. If the user does not need to recover character "吗", he/she can resume his/her inputting without any additional interruption.

In the example as shown in FIG. 4, a plurality of deleted language units are prompted to the user one by one in a order specified by deletion operations. Those skilled in the art can employ other user-friendly alternatives for prompting the deleted language units to the user. For instance, all the deleted language units can be prompted in the input prompting region 402. When one of prompted language units is selected, all deleted language units before the selected one and the selected one per se are recovered in the inputted text. In the example as shown in FIG. 4, deleted characters "时" and "吗" can be both prompted for selection. When the user selects character "吗", the deleted character "时" and the selected character "吗" per se are both recovered in the text editing region 401.

In the above, two different exemplary embodiments of the present invention are set forthwith reference to the specific examples. In these two embodiments, deleted language units are prompted to the user in different manners for further potential selection and thus lead to different advantageous user's experience. It can be understood by those skilled in the art that the embodiments shown in FIGS. 1 and 3 can be integrated to achieve both advantages of those embodiments, as set forth below.

Figure 5:
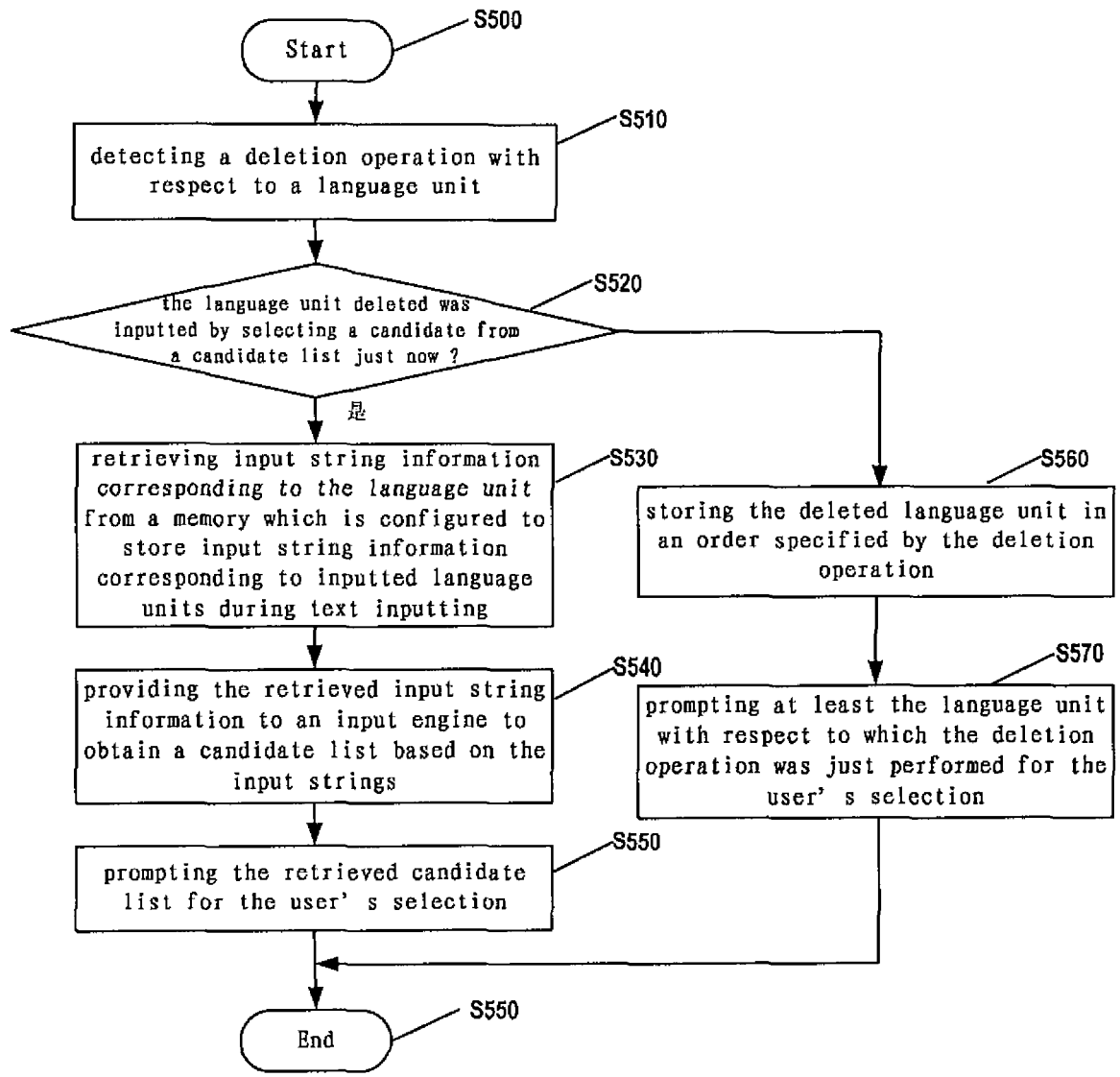

FIG. 5 schematically shows a flowchart of a method for facilitating text editing according to another illustrative embodiment of the present invention.

As shown in FIG. 5, at step S500, the flow of a method for facilitating text editing according to another illustrative embodiment of the present invention starts.

At step S510, a deletion operation with respect to a language unit is detected.

At step S520, it is determined whether the deleting operation is with respect to a language unit which was inputted by selecting a candidate from a candidate list just now.

If the result of determination is "yes", then the flow proceeds at step S530 to perform the steps similar with the embodiment illustrated in FIG. 1; otherwise, the flow proceeds at step S560 to perform the steps similar with the embodiment illustrated in FIG. 3.

At step S530, input string information corresponding to the deleted language unit are retrieved from a memory which is configured to store input string information corresponding to inputted language units during text inputting.

At step S540, the retrieved input string information is provided to an input engine to obtain a candidate list based on the input strings. The candidate list comprises the deleted language unit as one of candidates among others.

At step S550, the retrieved candidate list is prompted for the user's selection. In case that a desired language unit is comprised in the prompted candidate list, the user can directly select the desired one instead of repeating the same input string.

At step S560, the deleted language unit is stored in an order specified by the deletion operation. For example, deleted language unit can be popped into a stack (Last In First Out) in responsive to each deletion operation in sequence.

At step S570, at least the language unit with respect to which the deletion operation was just performed is prompted for the user's selection. In case that the user wants to recover the language unit(s) just deleted, the user can directly select the language units prompted in for example a specific region of the user interface, instead of repeating inputting.

At step S580, the flow of a method for facilitating text editing according to another illustrative embodiment of the present invention ends.

With reference to the examples as shown in FIGS. 2 and 4, when the user deletes a language unit "按时" without moving the input focus before deletion, the candidate list for the input string "anshi" would be prompted to the user for his/her selection. If three deletion operations with respect to "?", "吗", "时" are detected subsequently, at least the language unit "时", with respect to which the last deletion operation was just performed, would be prompted to the user for his/her selection. Although only describing a simple example for the present embodiment here, those skilled in the art can conceive various modifications and variations of the present embodiment to integrate the embodiments illustrated in FIGS. 1 and 3 in a proper and user-friendly manner.

Figure 6:
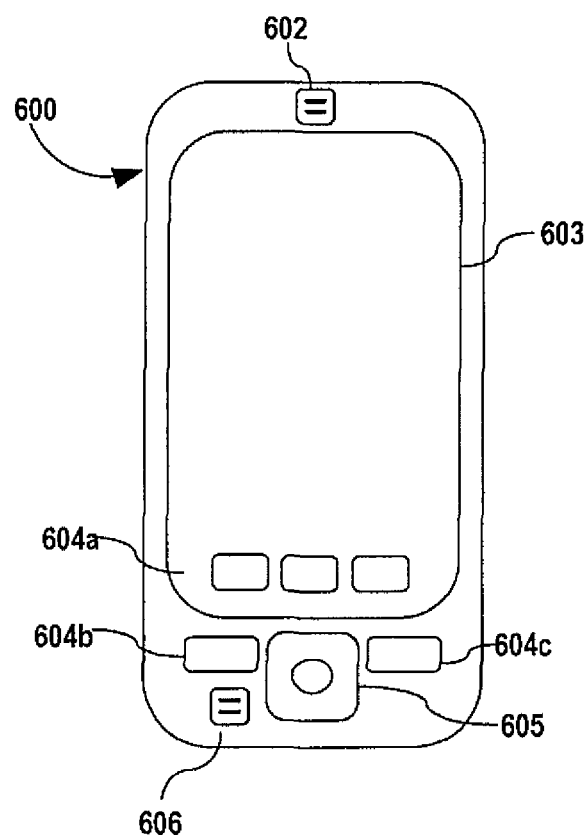
FIG. 6 shows a portable device in which one illustrative embodiment of the present invention can be implemented.

FIG. 6 shows a portable device in which one illustrative embodiment of the present invention can be implemented.

The mobile terminal 600 comprises a speaker or earphone 602, a microphone 606, a touch display 603 and a set of keys 604 which may include virtual keys 604a, soft keys 604b, 604c and a joystick 605 or other type of navigational input device.

Figure 7:
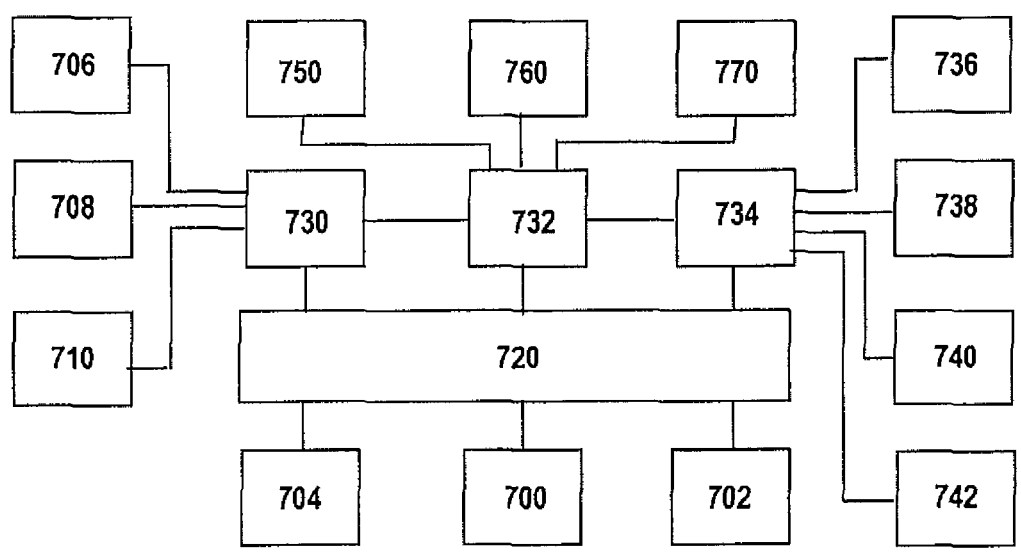
FIG. 7 shows a configuration schematic of the portable device as shown FIG. 6.

FIG. 7 shows a configuration schematic of the portable device as shown FIG. 6.

The internal component, software and protocol structure of the mobile terminal 600 will now be described with reference to FIG. 6. The mobile terminal has a controller 700 which is responsible for the overall operation of the mobile terminal and may be implemented by any commercially available CPU ("Central Processing Unit"), DSP ("Digital Signal Processor") or any other electronic programmable logic device. The controller 700 has associated electronic memory 702 such as RAM memory, ROM memory, EEPROM memory, flash memory, or any combination thereof. The memory 702 is used for various purposes by the controller 700, one of them being for storing data used by and program instructions for various software in the mobile terminal. The software includes a real-time operating system 720, drivers for a man-machine interface (MMI) 734, an application handler 732 as well as various applications. The applications can include a message text editor 750, a hand writing recognition (HWR) application 760, as well as various other applications 770, such as applications for voice calling, video calling, sending and receiving Short Message Service (SMS) messages, Multimedia Message Service (MMS) messages or email, web browsing, an instant messaging application, a phone book application, a calendar application, a control panel application, a camera application, one or more video games, a notepad application, etc. It should be noted that two or more of the applications listed above may be executed as the same application.

The MMI 734 also includes one or more hardware controllers, which together with the MMI drivers cooperate with the first display 736/603, and the keypad 738/604 as well as various other I/O devices such as microphone, speaker, vibrator, ringtone generator, LED indicator, etc. As is commonly known, the user may operate the mobile terminal through the man-machine interface thus formed.

The software can also include various modules, protocol stacks, drivers, etc., which are commonly designated as 730 and which provide communication services (such as transport, network and connectivity) for an RF interface 706, and optionally a Bluetooth interface 708 and/or an IrDA interface 710 for local connectivity. The RF interface 706 comprises an internal or external antenna as well as appropriate radio circuitry for establishing and maintaining a wireless link to abase station. As is well known to a man skilled in the art, the radio circuitry comprises a series of analogue and digital electronic components, together forming a radio receiver and transmitter. These components include, band pass filters, amplifiers, mixers, local oscillators, low pass filters, AD/DA converters, etc.

The mobile terminal also has a SIM card 704 and an associated reader. As is commonly known, the SIM card 704 comprises a processor as well as local work and data memory.

The various aspects of what is described above can be used alone or in various combinations. The teaching of this application may be implemented by a combination of hardware and software, but can also be implemented in hardware or software. The teaching of this application can also be embodied as computer program product on a computer readable medium, which can be any material media, such as floppy disks, CD-ROMs, DVDs, hard drivers, even network media and etc.

The specification of the present invention has been presented for purposes of illustration and description, and is not intended to be exhaustive or limited to the invention in the form disclosed. Many modifications and variations will be apparent to those of ordinary skill in the art. It is understood by those skilled in the art that the method and means in the embodiments of the present invention can be implemented in software, hardware, firmware or a combination thereof.

Therefore, the embodiments were chosen and described in order to better explain the principles of the invention, the practical application, and to enable others of ordinary skill in the art to understand that all modifications and alterations made without departing from the spirit of the present invention fall into the protection scope of the present invention as defined in the appended claims.

What is claimed is:

1. A method for facilitating text editing, comprising:
   receiving an input string;
   providing a candidate list comprising language units related to the input string;
   receiving a selection of a language unit from the candidate list;
   detecting a deletion operation;
   determining whether the deletion operation is with respect to the selected language unit;
   retrieving input string information corresponding to the language unit from a memory when it is determined that the deletion operation is with respect to the selected language unit, wherein the memory is configured to store input string information corresponding to inputted language units during text inputting;
   providing the retrieved input string information to an input engine to obtain the candidate list based on the input string;
   prompting the retrieved candidate list for the user's selection; and
   in an instance when the language unit has been confirmed, clearing the input string information from memory.

2. A method according to claim 1, wherein the input string information includes a mapping table of each language unit and its respective original input string.

3. A method according to claim 1, wherein the memory is cleared in response to at least one selected from a criterion group, the group including:
   inputting a symbol;
   moving a cursor from a current input focus; and
   inputting a new input string after a deletion operation.

4. A method according to claim 1, wherein the candidate list comprises the deleted language unit as one of candidates.

5. A portable device, comprising
   a processor being configured to control said portable device; and
   a memory storing computer program instructions which cause when running by the processor to perform a method for facilitating text editing in a portable device, the method comprising:
   receiving an input string;
   providing a candidate list comprising language units related to the input string;
   receiving a selection of a language unit from the candidate list;
   detecting a deletion operation;
   determining whether the deletion operation is with respect to the selected language unit;
   retrieving input string information corresponding to the language unit from a memory when it is determined that the deletion operation is with respect to the selected language unit, wherein the memory is configured to store input string information corresponding to inputted language units during text inputting;
   providing the retrieved input string information to an input engine to obtain the candidate list based on the input string;
   prompting the retrieved candidate list for the user's selection; and
   in an instance when the language unit has been confirmed, clearing the input string information from memory.

6. A portable device according to claim 5, wherein the input string information includes a mapping table of each language unit and its respective original input string.

7. A portable device according to claim 5, wherein the memory is cleared in response to at least one selected from a criterion group, the group including:
 inputting a symbol;
 moving a cursor from a current input focus; and
 inputting a new input string after a deletion operation.

8. A portable device according to claim 5, wherein the candidate list comprises the deleted language unit as one of candidates.

9. A computer program product comprising a non-transitory computer readable storage structure embodying computer program code thereon for execution by a computer processor, wherein said computer program code is hosted by a device and comprises instructions for performing a method comprising:
 receiving an input string;
 providing a candidate list comprising language units related to the input string;
 receiving a selection of a language unit from the candidate list;
 detecting a deletion operation;
 determining whether the deletion operation is with respect to the selected language unit;
 retrieving input string information corresponding to the language unit from a memory when it is determined that the deletion operation is with respect to the selected language unit, wherein the memory is configured to store input string information corresponding to inputted language units during text inputting;
 providing the retrieved input string information to an input engine to obtain the candidate list based on the input string;
 prompting the retrieved candidate list for the user's selection; and
 in an instance when the language unit has been confirmed, clearing the input string information from memory.

10. A method for facilitating text editing, comprising:
 receiving an input string;
 providing a candidate list comprising language units related to the input string;
 receiving a selection of a language unit from the candidate list;
 detecting a deletion operation;
 determining whether the deletion operation is with respect to a language unit which was inputted by selecting a candidate from the candidate list;
  in an instance when it is determined that the deletion operation is with respect to the language unit which was inputted by selecting the candidate from the candidate list:
   retrieving input string information corresponding to the language unit from a memory which is configured to store input string information corresponding to inputted language units during text inputting;
   providing the retrieved input string information to an input engine to obtain a candidate list based on the input strings;
   prompting the retrieved candidate list for selection;
   in an instance when the language unit has been confirmed, clearing the input string information from memory; and
  in an instance when it is determined that the deletion operation was not with respect to the language unit which was inputted by selecting the candidate from the candidate list:
   storing, in the memory, the deleted language unit in an order specified by the deletion operation;
   prompting at least the language unit with respect to which the deletion operation was just performed for selection; and
   in an instance when the language unit has been confirmed, clearing the stored language unit from the memory.

11. A portable device, comprising
 a processor being configured to control said portable device; and
 a memory storing computer program instructions which cause when running by the processor to perform a method for facilitating text editing in a portable device, the method comprising:
 receiving an input string;
 providing a candidate list comprising language units related to the input string;
 receiving a selection of a language unit from the candidate list;
 detecting a deletion operation;
 determining whether the deletion operation is with respect to a language unit which was inputted by selecting a candidate from the candidate list;
 in an instance when it is determined that the deletion operation is with respect to the language unit which was inputted by selecting the candidate from the candidate list:
  retrieving input string information corresponding to the language unit from a memory which is configured to store input string information corresponding to inputted language units during text inputting;
  providing the retrieved input string information to an input engine to obtain a candidate list based on the input strings;
  prompting the retrieved candidate list for selection;
  in an instance when the language unit has been confirmed, clearing the input string information from memory; and
 in an instance when it is determined that the deletion operation was not with respect to the language unit which was inputted by selecting the candidate from the candidate list:
  storing the deleted language unit in an order specified by the deletion operation;
  prompting at least the language unit with respect to which the deletion operation was just performed for selection; and
  in an instance when the language unit has been confirmed, clearing the stored language unit from the memory.

12. A computer program product comprising a non-transitory computer readable storage structure embodying computer program code thereon for execution by a computer processor, wherein said computer program code is hosted by a device and comprises instructions for performing a method comprising:
 receiving an input string;
 providing a candidate list comprising language units related to the input string;
 receiving a selection of a language unit from the candidate list;
 detecting a deletion operation;

determining whether the deletion operation is with respect to a language unit which was inputted by selecting a candidate from the candidate list;

in an instance when it is determined that the deletion operation is with respect to the language unit which was inputted by selecting the candidate from the candidate list:

retrieving input string information corresponding to the language unit from a memory which is configured to store input string information corresponding to inputted language units during text inputting;

providing the retrieved input string information to an input engine to obtain a candidate list based on the input strings;

prompting the retrieved candidate list for selection; and in an instance when the language unit has been confirmed, clearing the input string information from memory; and in an instance when it is determined that the deletion operation was not with respect to the language unit which was inputted by selecting the candidate from the candidate list:

storing, in the memory, the deleted language unit in an order specified by the deletion operation;

prompting at least the language unit with respect to which the deletion operation was just performed for selection; and in an instance when the language unit has been confirmed, clearing the stored language unit from the memory.

\* \* \* \* \*